(12) United States Patent
Ozaki et al.

(10) Patent No.: US 11,999,114 B2
(45) Date of Patent: Jun. 4, 2024

(54) WELDING DEVICE AND WELDING METHOD

(71) Applicant: MITSUBISHI HEAVY INDUSTRIES, LTD., Tokyo (JP)

(72) Inventors: Ryota Ozaki, Tokyo (JP); Sho Yamaguchi, Tokyo (JP); Jun Matsuoka, Tokyo (JP); Tomoya Iwanaga, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/845,235

(22) Filed: Jun. 21, 2022

(65) Prior Publication Data
US 2023/0202124 A1    Jun. 29, 2023

(30) Foreign Application Priority Data
Dec. 28, 2021  (JP) ................. 2021-214532

(51) Int. Cl.
*B29C 70/30*  (2006.01)
*B29C 65/30*  (2006.01)
(Continued)

(52) U.S. Cl.
CPC .............. *B29C 70/30* (2013.01); *B29C 65/30* (2013.01); *B29K 2101/12* (2013.01); *B29L 2009/00* (2013.01)

(58) Field of Classification Search
CPC ..... B29C 70/30; B29C 65/30; B29K 2101/12; B29L 2009/00
See application file for complete search history.

(56) References Cited

U.S. PATENT DOCUMENTS

| 3,748,207 A | 7/1973 | Campbell et al. |
| 8,603,279 B2 | 12/2013 | Malasse et al. |

(Continued)

FOREIGN PATENT DOCUMENTS

| CN | 211492875 U | 9/2020 |
| CN | 113306133 A | 8/2021 |

(Continued)

OTHER PUBLICATIONS

Performance Composites, "Mechanical Properties of Carbon Fibre Composite Materials," Table identifying Young's Modulus of 70 GPa (performance-composites.com/carbonfibre/mechanicalproperties_2.asp) Jul. 2009. (Year: 2009).*

(Continued)

*Primary Examiner* — Cynthia L Schaller
(74) *Attorney, Agent, or Firm* — HAUPTMAN HAM, LLP

(57) ABSTRACT

A welding device includes a first graphite heater and a second graphite heater that come into contact with a first member and a second member; and a first die and a second die, which sandwich the first and second graphite heaters with the first and second members interposed therebetween. The first and second graphite heaters have graphite sheets that generate heat by electric power, insulating materials, outer covers, and inner covers, and are configured such that structures of the graphite sheets covered by the insulating materials are interposed between outer covers and inner covers.

8 Claims, 6 Drawing Sheets

(51) Int. Cl.
   *B29K 101/12*    (2006.01)
   *B29L 9/00*      (2006.01)

(56) References Cited

U.S. PATENT DOCUMENTS

| | | | | |
|---|---|---|---|---|
| 2007/0175573 | A1* | 8/2007 | Fox | B32B 27/285 |
| | | | | 156/196 |
| 2016/0236454 | A1* | 8/2016 | Potts | B29C 70/543 |
| 2020/0298500 | A1 | 9/2020 | Koehn et al. | |
| 2022/0262702 | A1* | 8/2022 | Sato | C08K 3/28 |

FOREIGN PATENT DOCUMENTS

| | | | |
|---|---|---|---|
| DE | 102012215105 A1 | | 2/2013 |
| JP | S53-075367 U | | 6/1978 |
| JP | 2001-079949 A | | 3/2001 |
| JP | 2008254230 A | * | 10/2008 |
| JP | 2020-152110 A | | 9/2020 |
| WO | 2020/070692 A1 | | 4/2020 |

OTHER PUBLICATIONS

JP-2008254230-A Machine Translation of Description (Year: 2023).*
European Patent Office, "Extended Search Report for European Patent Application No. 22181229.0," dated Dec. 2, 2022.
Japan Patent Office, "Office Action for Japanese Patent Application 2021-214532," dated Jan. 31, 2023.

* cited by examiner

WELDING DEVICE AND WELDING METHOD

CROSS-REFERENCE TO RELATED APPLICATIONS

This application claims the benefit of priority to Japanese Patent Application Number 2021-214532 filed on Dec. 28, 2021. The entire contents of the above-identified application are hereby incorporated by reference.

BACKGROUND

1. Technical Field

The present disclosure relates to a welding device and a welding method.

2. Description of Related Art

For example, when manufacturing a structure employed in an aircraft, one of the schemes to apply strength to a long thermoplastic composite material is to press the thermoplastic composite material and another thermoplastic composite material as a reinforcing member while welding resins together contained therein and thereby weld these thermoplastic composite materials (co-consolidation) (Japanese Patent Application Publication No. 2020-152110).

Japanese Patent Application Publication No. 2020-152110 is an example of the related art.

Conventionally, heating required for welding of thermoplastic resins is performed by using a metal plate or the like having a built-in electric heater.

In such a case, the metal plate can serve as a useless heat capacity body, and this will require longer time for rise and fall of the temperature and also lead to waste of energy (electric power).

BRIEF SUMMARY

The present disclosure has been made in view of such circumstances, and an object is to provide a welding device that can realize efficient welding in terms of time and realize efficient welding in terms of energy (electric power).

To achieve the above object, the welding device and the welding method of the present disclosure employ the following solutions.

That is, a welding device according to one aspect of the present disclosure is a welding device for welding stacked materials to each other that contain a thermoplastic resin, the welding device includes: a heating unit configured to come into contact with each of the materials; and a mold configured to interpose the heating unit between each of the materials and the mold, the heating unit has a sheet-like heat generating body configured to generate heat by electric power, insulating layers, and a contact layer and is configured such that a structure in which the heat generating body is interposed between the insulating layers is laminated on the contact layer, and the contact layer has thermal conductivity of 10 W/m×K or greater at normal temperature and Young's modulus of 30 GPa or greater at normal temperature.

Further, a welding method according to one aspect of the present disclosure is a welding method for welding the materials to each other by the welding device described above, and the welding method includes: causing the heat generating body of the heating unit to generate heat; and pushing the mold to the material side.

According to the present disclosure, efficient welding in terms of time can be realized, and efficient welding in terms of energy (electric power) can be realized.

DETAILED DESCRIPTION

One embodiment of the present disclosure will be described below with reference to the drawings.

[Material Containing Thermoplastic Resin]

Figure 1:
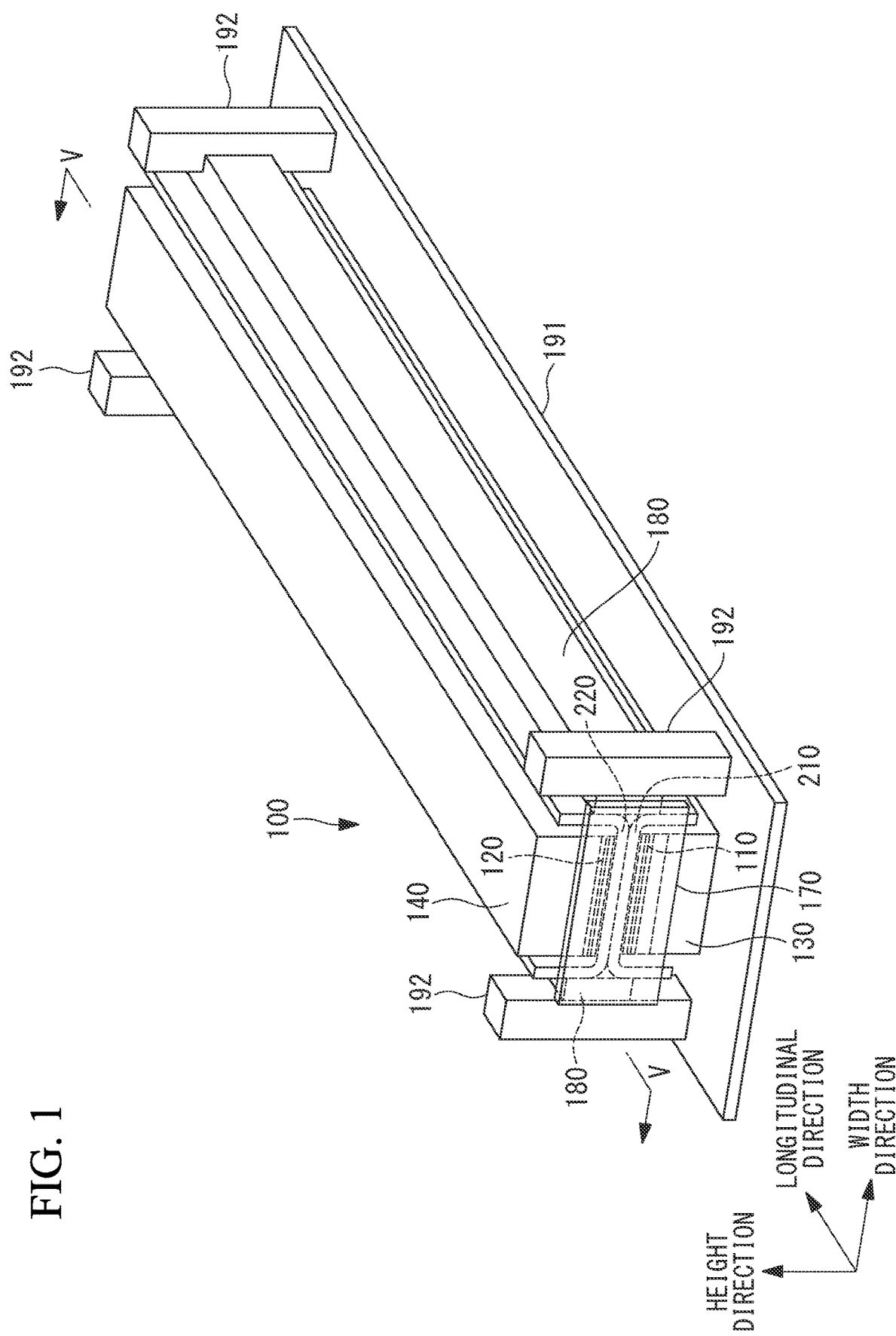
FIG. 1 is a perspective view of a welding device according to one embodiment of the present disclosure.

As illustrated in FIG. 1, the welding device 100 is a device for performing co-consolidation (hereafter, also simply referred to as "welding") on a first member 210 and a second member 220.

The first member 210 is a material containing a thermoplastic resin, specifically, which is a thermoplastic composite material such as fiber reinforced resin containing a thermoplastic resin (for example, CFRP or GFRP).

For example, the first member 210 has a plate-like web 211 and plate-like flanges (side walls) 212 arranged vertically in the height direction from respective two opposing sides of the web 211 and has a C-shaped or hat-shaped cross-sectional shape.

The first member 210 is a long member formed such that, when the dimension in the width direction (the direction in which the flanges 212 face each other) is defined as 1, the dimension in the longitudinal direction (the direction in which the web 211 and the flanges 212 extend) is 5 or greater.

For example, when the dimension in the width direction is 100 mm, the dimension in the longitudinal direction will be 500 mm or longer. Note that these numerical values are mere examples.

The second member 220 is a material containing a thermoplastic resin, specifically, which is a thermoplastic composite material such as fiber reinforced resin containing a thermoplastic resin (for example, CFRP or GFRP).

For example, the second member 220 has a plate-like web 221 and plate-like flanges (side walls) 222 arranged vertically in the height direction from respective two opposing sides of the web 221 and has a C-shaped or hat-shaped cross-sectional shape.

The second member 220 is a long member formed such that, when the dimension in the width direction (the direction in which the flanges 222 face each other) is defined as 1, the dimension in the longitudinal direction (the direction in which the web 221 and the flanges 222 extend) is 5 or greater.

For example, when the dimension in the width direction is 100 mm, the dimension in the longitudinal direction will be 500 mm or longer. Note that these numerical values are mere examples.

The first member 210 and the second member 220 are arranged in a state where the web 211 and the web 221 are stacked on each other and the outer circumferential faces thereof are in contact with each other and where each end of the flanges 212 and each end of the flanges 222 face opposite sides.

The welding device 100 welds the web 211 and the web 221 to each other in the first member 210 and the second member 220 arranged in such a way.

Note that each flange 212 is not an essential configuration in the first member 210 with which the web 211 is welded. The same applies to each flange 222 of the second member 220.

Further, the shapes of the first member 210 and the second member 220 described above are examples, and any shapes of the first member 210 and the second member 220 may be employed as long as these shapes are in a form in which plate-like portions stacked on each other are joined together.

[Welding Device]

Figure 2:
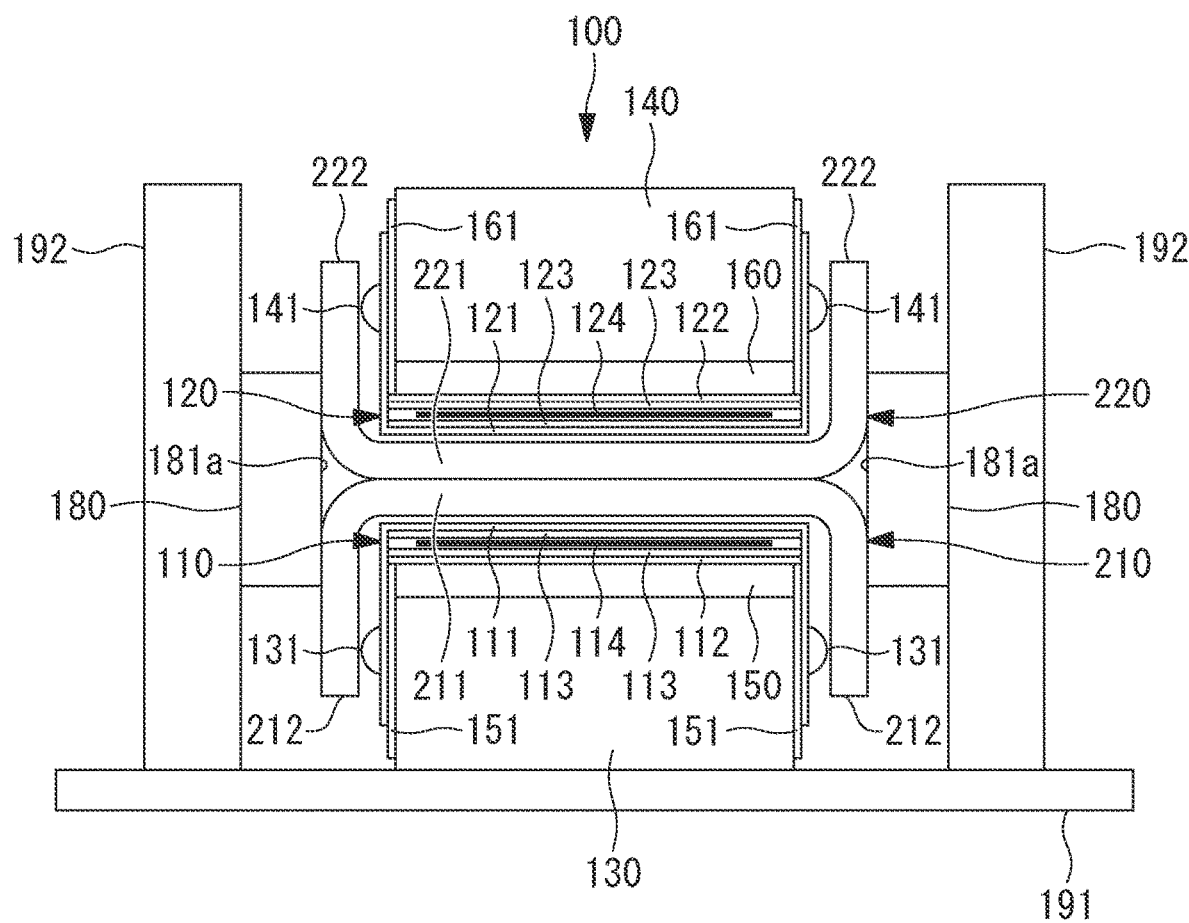
FIG. 2 is a front view of the welding device illustrated in FIG. 1 (when no inline plate is mounted).

As illustrated in FIG. 1 and FIG. 2, the welding device 100 includes a first unit having a first graphite heater (heating unit) 110 and a first die (mold) 130 and a second unit having a second graphite heater (heating unit) 120 and a second die (mold) 140.

The first member 210 and the second member 220 are stacked on each other and interposed between the first unit and the second unit.

In this state, the first unit is in a form such that the first unit is contained inside between the flanges 212 of the first member 210, and the second unit is in a form such that the second unit is contained inside between the flanges 222 of the second member 220.

Accordingly, the first member 210 and the second member 220 can be pressed by the first unit and the second unit.

The first unit and the second unit are arranged symmetrically about the interface between the first member 210 and the second member 220 (the joining interface in welding).

The first unit is a unit arranged below the first member 210 and the second member 220 and has the first graphite heater 110 and the first die 130.

The first die 130 is a long metal block extending in the longitudinal direction of the first member 210.

The first graphite heater 110 is provided to the first die 130 so that a heat insulation material 150 is interposed between the first die 130 and the first graphite heater 110.

The first graphite heater 110 is a device that heats the first member 210. The configuration of the first graphite heater 110 will be described later.

The top face of the first graphite heater 110 is a surface that comes into contact with the web 211 of the first member 210.

The second unit is arranged symmetrically with the first unit about the joining interface, and the under face of the second graphite heater 120 is a surface that comes into contact with the web 221 of the second member 220, as already described. That is, the second unit and the like are arranged in a form such that the first unit and the first member 210 are vertically inversed with respect to the joining interface. Thus, the detailed description for the second unit will be omitted.

Note that the second graphite heater 120, the second die 140, and a heat insulation material 160 of the second unit correspond to the first graphite heater 110, the first die 130, and the heat insulation material 150 of the first unit.

[Graphite Heater]

The welding device 100 includes the first graphite heater 110 and the second graphite heater 120 as devices for heating the first member 210 and the second member 220.

The configuration of the first graphite heater 110 and the second graphite heater 120 will be described below.

Figure 3:
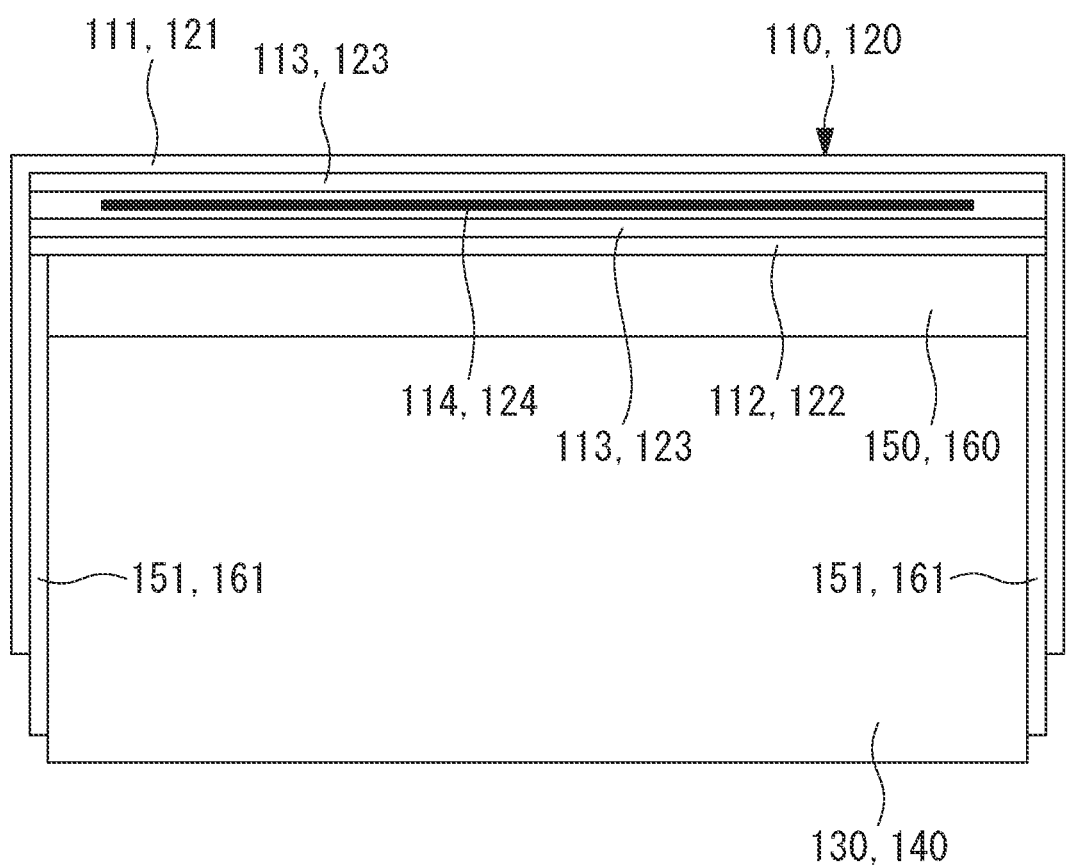
FIG. 3 is a front view of a first graphite heater and a first die illustrated in FIG. 2.

As illustrated in FIG. 3, the first graphite heater 110 is configured such that a graphite sheet (heat generating body) 114, two insulating materials (insulating layers) 113, an inner cover (contact layer) 112, and an outer cover (contact layer) 111 are laminated in layers.

The graphite sheet 114 is a sheet-like heat generating body that generates heat by electric power. The electric power supplied to the graphite sheet 114, that is, the heating value of the graphite sheet 114 is controlled by a control unit (not illustrate).

Note that the heat generating body is not limited to the graphite sheet 114 and may be any sheet-like body that generates heat by electric power.

The graphite sheet 114 is interposed and held between the two insulating materials 113.

The insulating materials 113 are members for electrical insulation between the graphite sheet 114 and the outer cover 111 and between the graphite sheet and the inner cover 112. The resistance of the insulating material 113 is 200 MΩ or higher at normal temperature.

The structure in which the graphite sheet 114 is interposed between the insulating materials 113 is interposed and held between the outer cover 111 and the inner cover 112.

The outer cover 111 is a plate whose cross-sectional shape is a C-shape and whose side plates cover the sides of the structure in which the graphite sheet 114 is interposed between the insulating materials 113 and the sides of the inner cover 112. Further, the outer cover 111 is also a portion that comes into contact with the first member 210 as the first graphite heater 110.

A material having good thermal conductive property and predetermined rigidity is employed for the material of the outer cover 111. An example of a physical property for evaluating the thermal conductive property may be thermal conductivity, which is preferably 10 W/m×K or greater at normal temperature in the present embodiment. Further, an example of a physical property for evaluating the rigidity is Young's modulus, which is preferably 30 GPa or greater in the present embodiment. An example of such a material may be a copper-based metal, high-thermal conductivity fine ceramics such as aluminum nitride or silicon carbide, or the like but is not limited thereto.

The inner cover 112 is a flat plate. Further, the inner cover 112 is also a portion that comes into contact with the heat insulation material 150 as the first graphite heater 110.

A material satisfying the same physical properties as the outer cover 111 is employed for the material of the inner cover 112. Note that these materials are not necessarily required to be the same material as long as they satisfy the above physical property.

In the first graphite heater 110 configured as described above, the side plates of the outer cover 111 cover the sides of the heat insulation material 150 and the first die 130. In this state, a heat insulation material 151 may be provided between each side plate of the outer cover 111 and the heat insulation material 150 and between each side plate of the outer cover 111 and the first die 130.

In the first graphite heater 110, the total thickness of a portion of the laminated graphite sheet 114, two insulating materials 113, inner cover 112, and outer cover 111 is about 3 mm or less.

Further, when each element forming the first graphite heater 110 is focused on in detail, it is preferable that the thickness of the graphite sheet 114 be 0.3 mm or less, the thickness of the insulating material 113 be 0.3 mm or less, and each thickness of the inner cover 112 and the outer cover 111 be 1 mm or less.

Note that, instead of the graphite sheet 114, a different sheet-like heat generating body may be employed. An example of such a different heat generating body may be a metal thin-film heater or a micro ceramic heater.

Further, the inner cover 112 may be omitted from the first graphite heater 110. In contrast, the outer cover 111 is essential for ensuring accuracy as a contact face to the first member 210.

The second graphite heater 120 is configured such that a graphite sheet 124, two insulating materials (insulating layers) 123, an inner cover (contact layer) 122, and an outer cover (contact layer) 121 are laminated in layers.

These components correspond to the graphite sheet 114, the insulating materials 113, the inner cover 112, and the outer cover 111 of the first graphite heater 110, and the second graphite heater 120 employs the same configuration as the first graphite heater 110. Thus, the detailed description for the second graphite heater 120 will be omitted.

The second graphite heater 120 configured as described above is provided such that the side plates of the outer cover 121 cover the sides of the heat insulation material 160 and the second die 140.

In this state, a heat insulation material 161 may be provided between each side plate of the outer cover 121 and the heat insulation material 160 and between each side plate of the outer cover 121 and second die 140.

[Inline Plate]

As illustrated in FIG. 1 and FIG. 4 to FIG. 6, the welding device 100 may include inline plates 170.

The inline plates 170 are plates attached to both end faces in the longitudinal direction of the first die 130.

The inline plates 170 are fastened to the end faces in the longitudinal direction of the first die 130 by bolts 193, for example.

Figure 6:
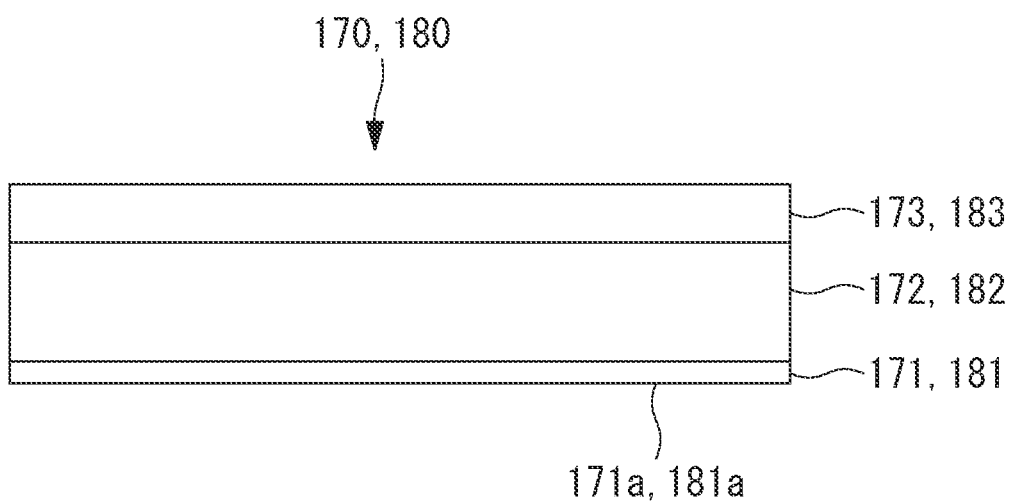
FIG. 6 is a sectional view of the inline plate or a side block.

As illustrated in FIG. 6, the inline plate 170 is configured such that a plate 171, a heat insulation material 172, and a plate 173 are laminated.

As the material of the plate 171 and the plate 173, a material having high strength and heat resistance is employed. An example of such a material may be a metal such as iron.

Figure 5:
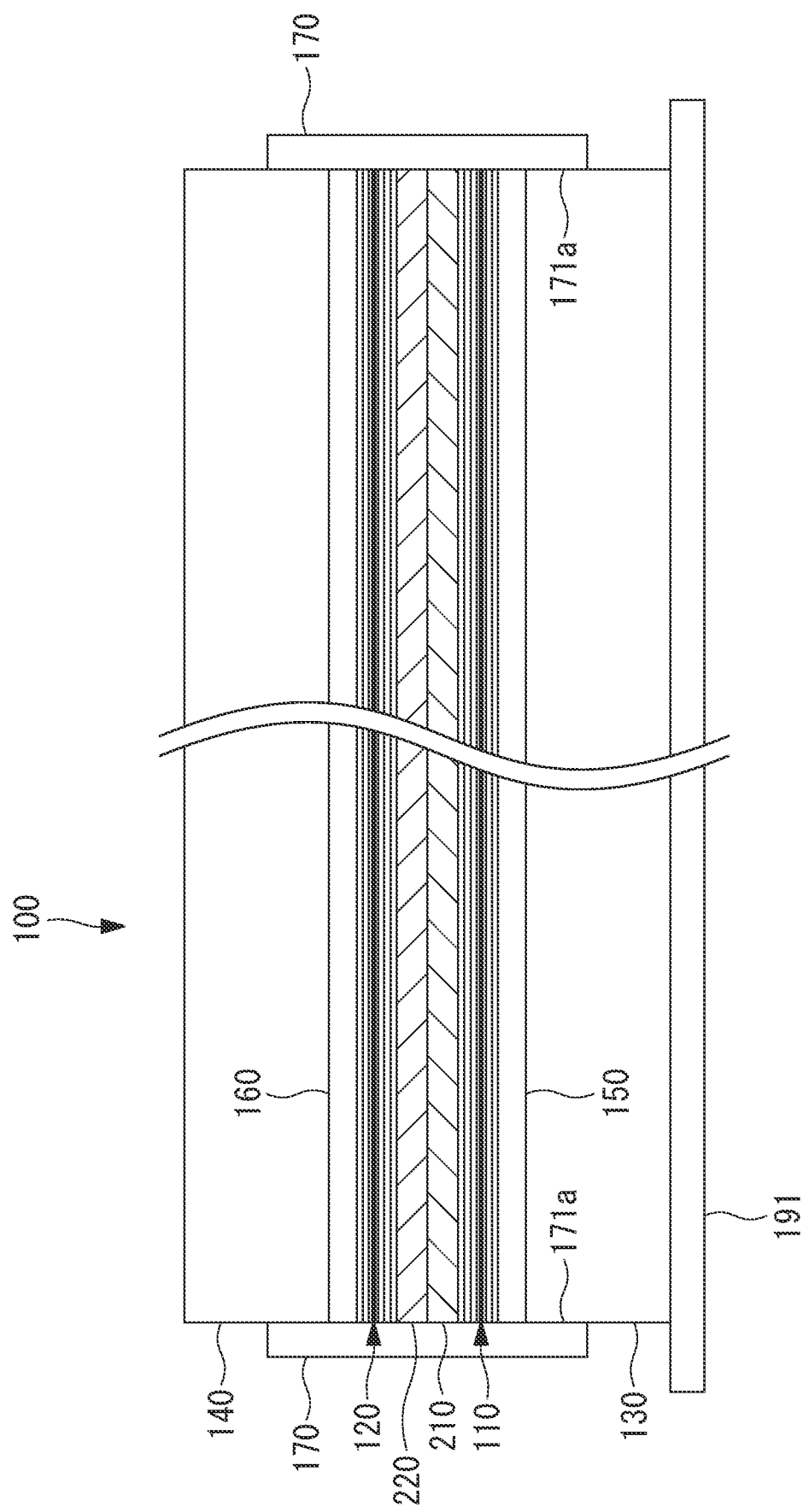
FIG. 5 is a cross-sectional view taken along a cut line V-V illustrated in FIG. 1.

As illustrated in FIG. 5, in a state where the inline plates 170 are attached to the first die 130, the surface (end contact face) 171a of each plate 171 abuts against the end faces in the longitudinal direction of the first member 210 and the second member 220 and determines the position in the longitudinal direction of the first member 210 and the second member 220. Note that, in FIG. 5, only the first member 210 and the second member 220 are hatched for the purpose of illustration.

Accordingly, even when the melted resin causes a state where the stacked first member 210 and second member 220 are likely to be displaced relative to each other, such displacement can be prevented.

Note that the inline plate 170 may abut against the end faces of the first graphite heater 110 and the second graphite heater 120 in addition to the first member 210 and the second member 220.

It is preferable to make the plate 171 as thin as possible within a range where it is possible to ensure sufficient strength to prevent deformation even when the plate 171 comes into contact with the first member 210 and the second member 220. This can reduce the volume of the plate 171 that serves as a heat capacity body.

On the other hand, the plate 173 is not required to be thin as with the plate 171 if the heat insulation material 172 as a heat insulation layer is provided between the plates 171 and 173. The plate 173 may rather be thicker than the plate 171 in order to ensure the rigidity as a function of the inline plate 170.

Figure 4:
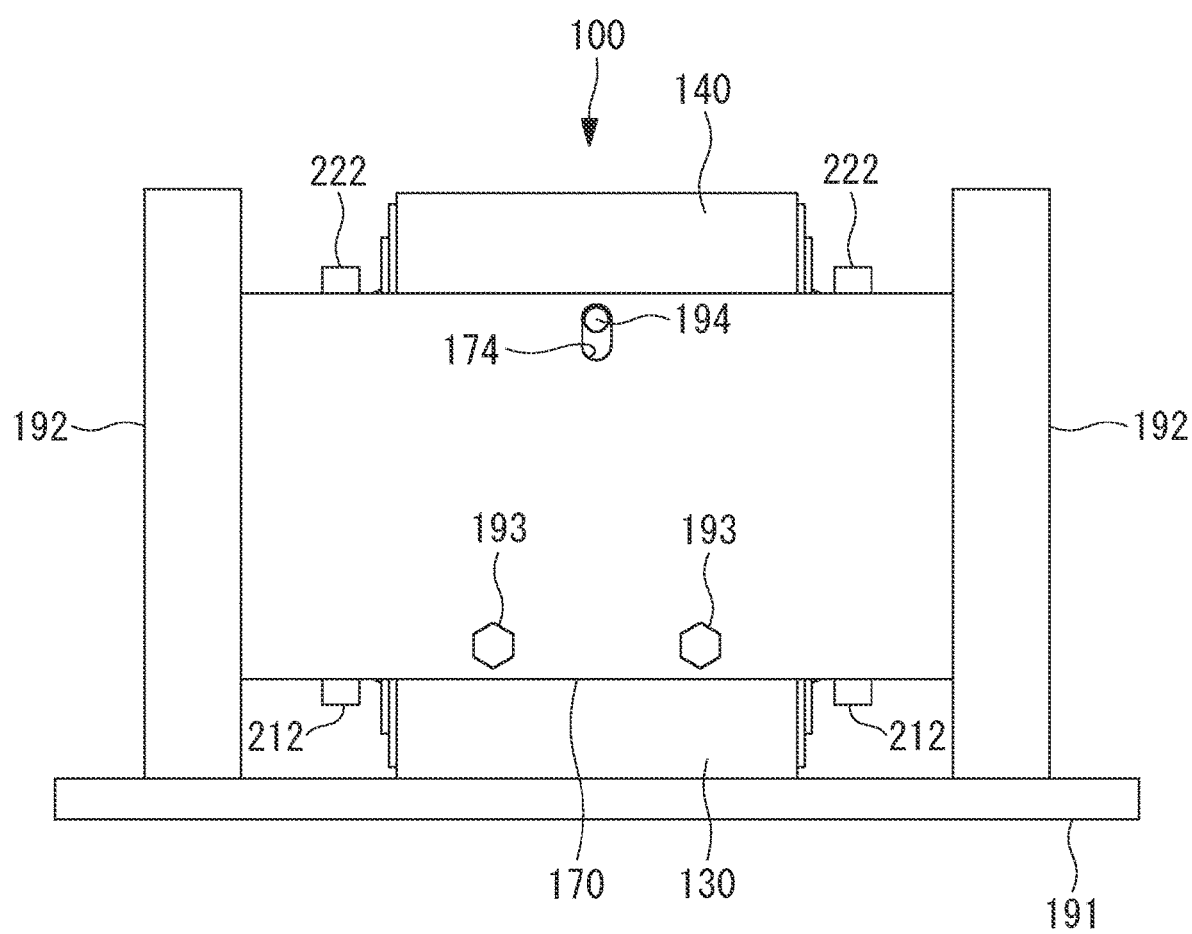
FIG. 4 is a front view of the welding device illustrated in FIG. 1 (when an inline plate is mounted).

As illustrated in FIG. 4, the inline plate 170 is fastened to the first die 130 but not fastened to the second die 140. Instead, a slot 174 extending in the height direction (see FIG. 1) of the welding device 100 is formed in the upper part of the inline plate 170 (at a position overlapping the second die 140). A pin 194 fixed to the second die 140 is inserted through the slot 174. There is a play in the height direction but no play in the width direction between the slot 174 and the pin 194.

With this configuration, the second die 140 is positioned in the width direction with respect to the first die 130 via the inline plate 170, and the second die 140 is movable within a range of the slot 174 in the height direction with respect to the first die 130.

The reason why the second die 140 is made movable is to ensure a motion margin needed for pushing the second die 140 to the first die 130 side when pressing the first member 210 and the second member 220.

Note that the inline plate 170 is not necessarily required to be fastened to the first die 130 and may be fastened to the base plate 191 as long as the first die 130 and the base plate 191 are fixed to each other, for example.

[Side Block]

As illustrated in FIG. 1, FIG. 2, and FIG. 6, the welding device 100 may include side blocks 180.

Each side block 180 is a plate extending in the longitudinal direction of the welding device 100.

The side block 180 is attached to posts 192 erected on the base plate 191 so as to be located on both sides of the flange 212 of the first member 210 and the flange 222 of the second member 220.

As illustrated in FIG. 6, the side block 180 is configured such that a plate 181, a heat insulation material 182, and a plate 183 are laminated.

As illustrated in FIG. 1 and FIG. 2, in a state where the side block 180 is attached to the posts 192, the surface (side contact face) 181a of each plate 181 abuts against the side faces of the flange 212 of the first member 210 and the flange 222 of the second member 220 and determines the position in the width direction of the first member 210 and the second member 220.

Accordingly, even when the melted resin causes a state where the stacked first member 210 and second member 220 are likely to be displaced relative to each other, such displacement can be prevented.

It is preferable to make the plate 181 as thin as possible within a range where it is possible to ensure sufficient strength to prevent deformation even when the plate 181 comes into contact with the first member 210 and the second member 220. This can reduce the volume of the plate 181 that serves as a heat capacity body.

On the other hand, the plate 183 is not required to be thin as with the plate 181 if the heat insulation material 182 as a heat insulation layer is provided between the plates 181 and 183. The plate 183 may rather be thicker than the plate 181 in order to ensure the rigidity as a function of the side block 180.

[Plunger]

As illustrated in FIG. 2, the welding device 100 may include plungers 131 and 141.

Each plunger 131 is a member that can push the flange 212 of the first member 210 in a direction away from the first die 130 in the width direction. For example, the plunger 131 is a component having a spring as an elastic body.

For example, the plunger 131 may be provided to the side face of the outer cover 111 covering the side of the first die 130 or may be provided to the side face of the first die 130.

Accordingly, even when the melted resin causes a state where the flange 212 is likely to incline toward the first die 130, such inclination can be prevented.

Note that, since the plunger 141 is provided on the second die 140 side but employs the same configuration as the plunger 131, the detailed description for the plunger 141 will be omitted.

[Method of Welding]

The welding device 100 configured as described above welds the first member 210 and the second member 220 as follows.

That is, first, as illustrated in FIG. 1 and FIG. 2, the first member 210 and the second member 220 are set in the welding device 100 so that the web 211 of the first member 210 and the web 221 of the second member 220 are stacked on each other and the outer faces thereof come into contact with each other.

In this step, the inline plates 170, the side blocks 180, and the plungers 131 and 141 may be provided.

Next, the first graphite heater 110 and the second graphite heater 120 are caused to generate heat. In detail, electric power is supplied to the graphite sheet 114 and the graphite sheet 124 to cause the graphite sheet 114 and the graphite sheet 124 to generate heat.

Further, to consolidate the melted thermoplastic resin, the second die 140 is pushed against the first die 130 side to press the first member 210 and the second member 220.

The first member 210 and the second member 220 are then cooled, and thereby the first member 210 and the second member 220 are integrated.

According to the present embodiment, the following advantageous effects are achieved.

Since the first graphite heater 110 is configured such that the structure in which the graphite sheet 114 is interposed between the insulating materials 113 is interposed between the outer cover 111 and the inner cover 112, the heat capacity body surrounding the graphite sheet 114 as a heat generating body can be made compact.

This eliminates the need for heating a useless heat capacity body. Thus, a time required for rise and fall of the temperature is shortened, thereby efficient welding in terms of time can be realized, and efficient welding in terms of energy (electric power) can be realized. The same applies to the second graphite heater 120.

Further, if the heat insulation material 150 and the heat insulation material 160 are provided, the amount of heat transferred from the first graphite heater 110 to the first die 130 and the amount of heat transferred from the second graphite heater 120 to the second die 140 can be suppressed.

Accordingly, the heat from the first graphite heater 110 and the second graphite heater 120 can be efficiently and intensively transferred to the first member 210 and the second member 220 (welding portion).

Further, if the inline plate 170 is provided, even when the melted resin causes a state where the stacked first member 210 and second member 220 are likely to be displaced relative to each other in the longitudinal direction, such displacement can be prevented.

Further, if the inline plate 170 has the heat insulation material 172, heat dissipation via the inline plate 170 from the end faces of the first member 210 and the second member 220, the end faces of the first graphite heater 110 and the second graphite heater 120, and the end faces of the first die 130 and the second die 140 can be suppressed.

Further, if the side block 180 is provided, even when the melted resin causes a state where the stacked first member 210 and second member 220 are likely to be displaced relative to each other in the width direction, such displacement can be prevented.

Further, if the side block 180 has the heat insulation material 182, heat dissipation via the side block 180 from the side faces of the first member 210 and the second member 220 can be suppressed.

Further, if the plungers 131, 141 are provided, even when the melted resin causes a state where the flanges 212, 222 are likely to incline inward, such inclination can be prevented.

Note that a welding step automated by a robot may be implemented by attaching the first unit having the first graphite heater 110 and the first die 130 and the second unit having the second graphite heater 120 and the second die 140 to gripping parts of robot arms, respectively. Such a robot is incorporated in a production line of a structure employed by an aircraft, for example.

One embodiment as described above is recognized as follows, for example.

That is, a welding device (100) according to one aspect of the present disclosure is a welding device for welding stacked materials (210, 220) to each other that contain a thermoplastic resin, the welding device includes: a heating unit (110, 120) configured to come into contact with each material; and a mold (130, 140) configured to interpose the heating unit between the material and the mold, the heating unit has a graphite sheet (114, 124) configured to generate heat by electric power, insulating layers (113, 123), and a contact layer (111, 121) and is configured such that a structure in which the graphite sheet is interposed between the insulating layers is laminated on the contact layer, and the contact layer has thermal conductivity of 10 W/m×K or greater at normal temperature and Young's modulus of 30 GPa or greater at normal temperature.

According to the welding device of the present aspect, since the heating unit configured to come into contact with each material containing the thermoplastic resin and the mold configured to interpose the heating unit between the material and the mold are provided, the heating unit has the graphite sheet configured to generate heat by electric power, the insulating layers, and the contact layer and is configured such that the structure in which the graphite sheet is interposed between the insulating layers is laminated on the contact layer, and the contact layer has thermal conductivity of 10 W/m×K or greater at normal temperature and Young's modulus of 30 GPa or greater at normal temperature, the heat capacity body of the heating unit surrounding the graphite sheet as a heat generating body can be made compact.

This eliminates the need for heating a useless heat capacity body. Thus, a time required for rise and fall of the temperature is shortened, thereby efficient welding in terms of time can be realized, and efficient welding in terms of energy (electric power) can be realized.

Further, the welding device according to one aspect of the present disclosure includes a heat insulation material (150, 160) provided between the heating unit and the mold.

According to the welding device of the present aspect, since the heat insulation material provided between the heating unit and the mold is provided, the amount of heat transferred from the heating unit to the mold can be suppressed.

Accordingly, the heat from the heating unit can be efficiently and intensively transferred to the material (welding portion).

Further, the welding device according to one aspect of the present disclosure includes an inline plate (170) having an end contact face (171*a*) configured to abut against end faces of the materials.

According to the welding device of the present aspect, since the inline plate having the end contact face configured to abut against the end faces of the materials is provided, the materials can be positioned.

Accordingly, even when the melted resin causes a state where the stacked materials are likely to be displaced relative to each other, such displacement can be prevented.

Further, in the welding device according to one aspect of the present disclosure, the inline plate has a plate (171) forming the end contact face and a second heat insulation material (172) laminated on the plate.

According to the welding device of the present aspect, since the inline plate has the plate forming the end contact face and the second heat insulation material laminated on the plate, the heat dissipation via the inline plate from the end face of the material, the end face of the heating unit, and/or the end face of the mold can be suppressed.

Further, the welding device according to one aspect of the present disclosure includes a side block (180) having a side contact face (181*a*) configured to abut against side faces of the materials.

According to the welding device of the present aspect, since the side block having the side contact face configured to abut against the side faces of the materials is provided, the materials can be positioned.

Accordingly, even when the melted resin causes a state where the stacked materials are likely to be displaced relative to each other, such displacement can be prevented.

Further, in the welding device according to one aspect of the present disclosure, the side block (180) has a plate (181) forming the side contact face and a third heat insulation material (182) laminated on the plate.

According to the welding device of the present aspect, since the plate forming the side contact face and the third heat insulation material laminated on the plate are provided, the heat dissipation via the side block from the side face of the material can be suppressed.

Further, in the welding device according to one aspect of the present disclosure, the material has a side wall (212, 222) arranged vertically so as to cover a side of the mold, and the welding device further includes a pushing member (131, 141) configured to push the side wall of the material in a direction away from the mold.

According to the welding device of the present aspect, since the material has the side wall arranged vertically so as to cover a side of the mold, and the pushing member configured to push the side wall of the material in a direction away from the mold is provided, even when the melted resin causes a state where the side wall is likely to incline toward the mold, such inclination can be prevented.

Further, the welding method according to one aspect of the present disclosure is a welding method for welding the materials to each other by the welding device described above, and the welding method includes steps of: causing the graphite sheet of the heating unit to generate heat; and pushing the mold to the material side.

LIST OF REFERENCE NUMERALS

100 welding device
110 first graphite heater (heating unit)
111 outer cover (contact layer)
112 inner cover (contact layer)
113 insulating material (insulating layer)
114 graphite sheet
120 second graphite heater (heating unit)
121 outer cover (contact layer)
122 inner cover (contact layer)
123 insulating material (insulating layer)
124 graphite sheet
130 first die (mold)
131 plunger
140 second die (mold)
141 plunger
150 heat insulation material
151 heat insulation material
160 heat insulation material
161 heat insulation material
170 inline plate
171 plate
171*a* surface (end contact face)
172 heat insulation material (second heat insulation material)
173 plate
174 slot
180 side block
181 plate
181*a* surface (side contact face)
182 heat insulation material (third heat insulation material)
183 plate
191 base plate
192 post
193 bolt
194 pin
210 first member (material)
211 web
212 flange (side wall)
220 second member (material)
221 web
222 flange (side wall)

What is claimed is:

1. A welding device for welding stacked materials to each other that contain a thermoplastic resin, the welding device comprising:
a first unit;
a second unit, the materials being interposed between the first unit and the second unit;
wherein the first unit includes a first heating unit configured to come into contact with one of the materials, and a first mold arranged with the first heating unit,
wherein the second unit includes a second heating unit configured to come into contact with another of the materials, and a second mold arranged with the second heating unit,
wherein the first heating unit and the second heating unit each have a sheet-like heat generating body configured to generate heat by electric power, insulating layers interposing the heat generating body therebetween, and a contact layer on which the insulating layers interposing the heat generating body therebetween are laminated, and wherein the contact layers are provided in the first heating unit and the second heating unit, each having thermal conductivity of 10 W/m×K or greater at normal temperature and Young's modulus of 30 GPa or greater at normal temperature.

2. The welding device according to claim 1 further comprising a heat insulation material provided between the first heating unit and the first mold.

3. The welding device according to claim 1 further comprising an inline plate having an end contact face configured to abut against end faces of the materials.

4. The welding device according to claim 3, wherein the inline plate has a plate portion forming the end contact face and a second heat insulation material laminated on the plate portion.

5. The welding device according to claim 1 further comprising a side block having a side contact face configured to abut against side faces of the materials.

6. The welding device according to claim 5, wherein the side block has a plate forming the side contact face and a third heat insulation material laminated on the plate.

7. The welding device according to claim 1, wherein each of the materials has a side wall arranged vertically so as to cover a side of the first or second mold, the welding device further comprising a pushing member configured to push the side wall of each of the materials in a direction away from the first or second mold.

8. A welding method for welding the materials to each other by the welding device according to claim 1, the welding method comprising:
  causing the heat generating bodies of the first and second heating units to generate heat; and
  pushing the first and second heating units by the first and second molds to the materials.

* * * * *